US012700409B2

(12) United States Patent (10) Patent No.: US 12,700,409 B2
Palos (45) Date of Patent: Aug. 4, 2026

(54) TRANSCRIPTION BASED ON SPEECH AND VISUAL INPUT

(71) Applicant: GOOGLE LLC, Mountain View, CA (US)

(72) Inventor: Xavier Benavides Palos, Beverly Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 186 days.

(21) Appl. No.: 18/048,317

(22) Filed: Oct. 20, 2022

(65) Prior Publication Data

US 2024/0135931 A1 Apr. 25, 2024
US 2024/0233729 A9 Jul. 11, 2024

(51) Int. Cl.
| | |
|---|---|
| *G10L 15/26* | (2006.01) |
| *G06N 3/047* | (2023.01) |
| *G06V 20/40* | (2022.01) |
| *G06V 40/16* | (2022.01) |
| *G10L 15/18* | (2013.01) |
| *G10L 15/19* | (2013.01) |
| *G10L 25/84* | (2013.01) |

(52) U.S. Cl.
CPC .............. *G10L 15/26* (2013.01); *G06V 20/41* (2022.01); *G10L 15/1815* (2013.01); *G06N*

*3/047* (2023.01); *G06V 40/171* (2022.01); *G10L 15/19* (2013.01); *G10L 25/84* (2013.01)

(58) Field of Classification Search
CPC ......... G10L 15/26; G10L 15/19; G10L 25/84; G06V 40/171; G06N 3/047; H04W 12/02
USPC .......................................................... 704/251
See application file for complete search history.

(56) References Cited

U.S. PATENT DOCUMENTS

| | | | |
|---|---|---|---|
| 2005/0038653 A1* | 2/2005 | Roth ........................ | G10L 15/19 |
| | | | 704/251 |
| 2016/0357252 A1 | 12/2016 | Gavriliuc et al. | |
| 2018/0047396 A1 | 2/2018 | Forutanpour et al. | |
| 2019/0378001 A1* | 12/2019 | Litvak ..................... | G06N 3/047 |
| 2020/0058302 A1* | 2/2020 | Wu ......................... | G06V 40/171 |
| 2021/0118440 A1 | 4/2021 | Peng et al. | |
| 2021/0125609 A1* | 4/2021 | Dusan ..................... | G10L 25/84 |
| 2023/0222757 A1* | 7/2023 | Beith .................... | H04W 12/02 |
| | | | 382/103 |

FOREIGN PATENT DOCUMENTS

CN 114691073 A * 12/2020 ............... G06F 3/16

* cited by examiner

*Primary Examiner* — Farzad Kazeminezhad
(74) *Attorney, Agent, or Firm* — Brake Hughes Bellermann LLP

(57) ABSTRACT

A method can include receiving audio input of speech, receiving visual input while receiving the audio input, generating a semantic description based on the visual input, and presenting a transcription of the speech based on the audio input and the semantic description.

18 Claims, 8 Drawing Sheets

Electronic
device
104

Microphone
302

Camera
304

IMU
306

Location determiner
308

Audio transcriber
310

Description engine
312

Modification engine
314

Trigger 316

Confidence
318

Word type
320

Homonym
322

Word modifier
324

Transcription outputter
326

Processor
328

Memory
330

Input/output
332

600

Receive audio input of speech
602

Receive visual input
604

Generate semantic description
606

Present transcription of speech
608

TRANSCRIPTION BASED ON SPEECH AND VISUAL INPUT

TECHNICAL FIELD

This description relates to speech transcription.

BACKGROUND

When live speech is transcribed, some words can be ambiguous and/or erroneously transcribed. Mistakes in transcriptions can be frustrating to users.

SUMMARY

Live speech can be transcribed with visual information as an additional input. The visual information can provide context for the transcription of the speech. An electronic device and/or computing system can generate a semantic description based on the visual information, and generate the transcription based on both the speech and the semantic description.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

An electronic device, such as a head-mounted wearable device worn by a user, can transcribe speech based on both audio input of speech and visual input. The electronic device can receive the visual input concurrently with the audio input, and transcribe and present the speech to the user live and/or in real time. The electronic device can generate a semantic description of a scene and/or context based on the visual input. The electronic device can generate and/or present the transcription of the speech based on the audio input and the semantic description.

In some examples, the electronic device can transcribe the speech based on the audio input, and modify one or more transcribed words based on the visual input and/or semantic description in response to a trigger. The trigger can be a confidence level of a transcribed word not satisfying a confidence threshold, a transcribed word being a predetermined type of word (such as a noun, a verb, an adjective, and/or an adverb), and/or the transcribed word having a homonym, as non-limiting examples.

Figure 1:
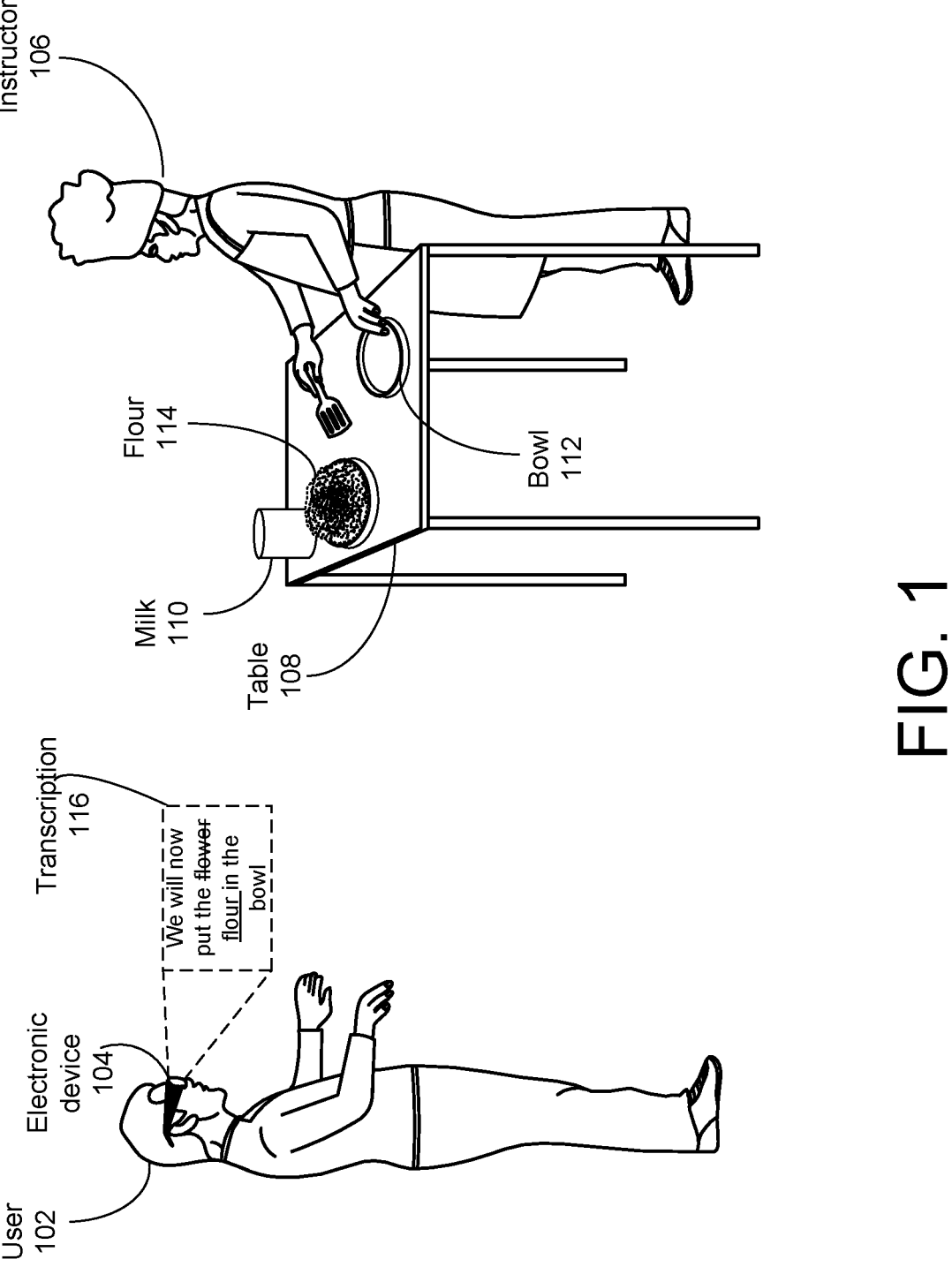
FIG. 1 shows a user wearing an electronic device that transcribes speech while the user is in a cooking class.

FIG. 1 shows a user 102 wearing an electronic device 104 that transcribes speech while the user 102 is in a cooking class. The electronic device 104 can include a head-mounted wearable device, such as augmented-reality glasses, an example of which is shown and described in detail with respect to FIGS. 5A and 5B.

The cooking class in which the user 102 is present can include an instructor 106 mixing ingredients for a recipe. The instructor 106 has arranged milk 110, a bowl 112, and flour 114 on a table 108.

The electronic device 104 can include one or more visual input devices, such as one or more cameras, that capture images of the scene, including the instructor 106, the table 108, and the mile, bowl, and flour on the table 108. The electronic device 104 can generate a semantic description of the scene based on the visual input and/or captured image(s), such as, "person cooking," or, "person, table, bowl, milk, flour."

The electronic device 104 can present a transcription 116 of speech to the user 102. The electronic device 104 can present the transcription 116 within a lens and/or display that is included in the electronic device 104. The transcription 116 can include visual representations of words spoken by persons, such as the instructor 106, in proximity to the user 102.

In the example shown in FIG. 1, the instructor 106 spoke, "We will now put the flour into the bowl." The word, "flour," spoken by the instructor 106, sounds similar to, and/or is a homonym of, the word, "flower." Both of the words, "flour," and, "flower," are nouns, and could be put into a bowl. Without additional information beyond the audio input of the instructor's 106 speech, the spoken word, "flour," or, "flower," could be ambiguous, and result in an error in the transcription of the speech by the electronic device 106.

The electronic device 104 can resolve ambiguities in transcribing speech by considering context, such as visual input, when transcribing speech. In the example shown in FIG. 1, the electronic device 104 can consider the visual input and/or captured image of the instructor 106 cooking, which can be transformed into a semantic description, when transcribing the speech of the instructor. For example, based on the visual context of the instructor 106 cooking, the electronic device 104 can transcribe the instructor's speech as, "We will now put the flour into the bowl," rather than as, "We will now put the flower into the bowl." Transcribing the instructor's 106 speech accurately based on visual input can reduce confusion and/or annoyance on the part of the user 102.

While methods, functions, and/or techniques are described herein as being performed by the electronic device 104 worn on the head of the user 102, any of these methods, functions, and/or techniques can be distributed between the electronic device 104 and any number of other computing devices in communication with the electronic device 104. The electronic device 104 can, for example, send visual data and/or audio data to a remote server, and the remote server can transcribe the audio data based on the visual data and/or audio data, and send the transcribed speech to the electronic device 104 for presentation to the user 102 by the electronic device 104.

Figure 2:
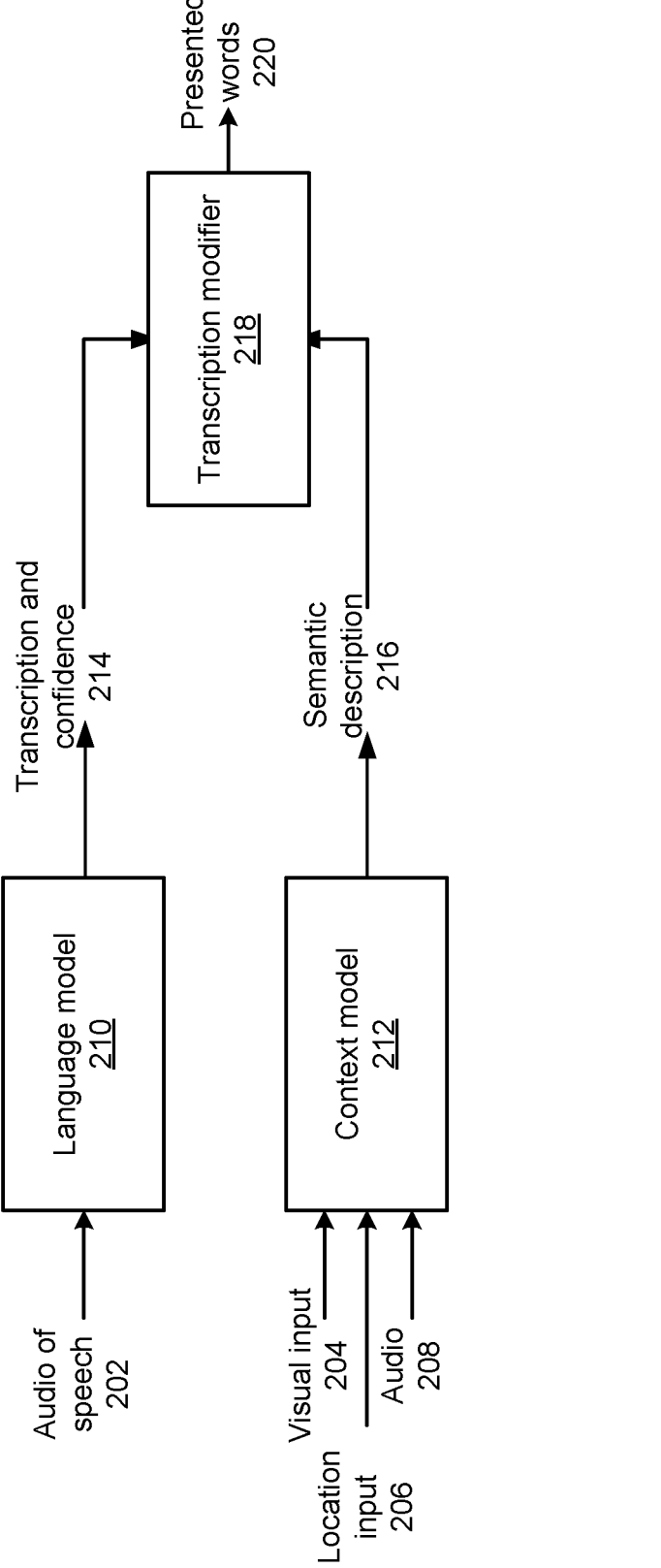
FIG. 2 is a block diagram showing a system that transcribes speech based on audio of the speech and visual input.

FIG. 2 is a block diagram showing a system that transcribes speech based on audio of the speech and visual input. The system shown in FIG. 2 can be implemented by any combination of computing devices, such as the electronic device 104 and any number of computing devices in communication with the electronic device 104, such as a remote server in communication with the electronic device 104 via the Internet.

A language model 210 can receive audio of speech 202. The audio of speech 202 can include audio input received via a microphone included in the electronic device 104. The audio of speech 202 can include audio input based on speech spoken by a human.

The language model 210 can include a machine learning language model. The machine learning language model can include, for example, Language Models for Dialog Applications (LaMDA). The LaMDA can include a transformer-based neural language model that transcribes spoken speech between multiple humans.

The language model 210 can generate a transcription and confidence levels (214). The transcription and confidence levels (214) can include a sequence of words and confidence levels for individual words within the sequence of words. In some examples, the transcription and confidence levels (214) can include multiple possible words for particular words or locations of words, and confidence levels for each of the multiple possible words.

The system can include a context model 212. The context model 212 can generate and/or determine a context within which, and/or during which, the language model 210 receives the audio of speech 202. The context model 212 can determine and/or generate the context based on visual input 204, location input 206, and/or audio input 208.

The context model 212 can consider visual input 204 in generating and/or determining the context based on one or more images captured by a camera. In some examples, the context model can generate and/or determine the context based on recognizing and/or classifying individual objects within images captured by the camera (such as a person, a table, milk, a bowl, and flour in the example shown in FIG. 1). In some examples, the context model can generate and/or determine the context based on recognizing relationships between recognized objects within images captured by the camera (such as a person cooking in the example shown in FIG. 1).

The context model 212 can consider location input 206 in generating and/or determining the context based on input from a location-determining system, such as a Global Positioning System (GPS), and/or a movement-determining system such as an inertial measurement unit (IMU) and/or accelerometer. In some examples, if the location input 206 indicates that the user 102 and/or electronic device 104 is periodically moving up and down while moving laterally, the context model 212 can determine that the user 102 is running. In some examples, if the location input 206 indicates that the user 102 and/or electronic device 104 is moving at a rate of speed and with curved movements corresponding to automobile movements, the context model 212 can determine that the user 102 is riding in a motor vehicle and/or driving.

The context model 212 can consider audio input 208 in generating and/or determining the context based on audio input from a microphone. The context model 212 can consider audio input 208 other than, and/or in addition to, the audio of speech 202 that is transcribed by the language model 210, in determining the context. In some examples, if the audio input 208 includes loud music and multiple human voices, the context model 212 can determine that the user 102 is at a concert. In some examples, if the audio input 208 includes the sound of rolling waves of water, the context model 212 can determine that the user 102 is at the ocean and/or beach.

The context model 212 can generate a semantic description 216 of the context. In some examples, the semantic description 216 can include a list of objects recognized and/or classified in the captured image(s) (such as person, table, milk, bowl, and flour in the example of FIG. 1). In some examples, the list of objects can include confidence levels indicating the likelihood that the recognized objects correspond to the categories of objects included in the list of objects.

In some examples, the semantic description 216 can include a description of user activity. The description of user activity can include verbs that can be supplemented by nouns and connector terms, such as, for example, "running," "riding in motor vehicle," or "cooking." In some examples, the descriptions of user activity can be supplemented by confidence levels indicating a likelihood that the description of user activity is correct.

The system can include a transcription modifier 218. The transcription modifier 218 can modify the transcription 214 generated by the language model 210 based on the semantic description generated by the context model 212.

In some examples, the transcription modifier 218 can modify, and/or consider modifying, words in the transcription in response to a trigger. In some examples, the trigger can include a confidence level of a word included in the transcription 214 not satisfying a confidence threshold (such as the confidence level being below the confidence threshold). In some examples, the trigger can include a word in the transcription 214, that may be modified based on being a type of word for which the transcription could benefit from the semantic description, such as a noun, verb, adjective, and/or adverb, but not a connective. In some examples, the trigger can include a word in the transcription having a homonym and/or another word for which the pronunciation is similar enough to satisfy a similarity threshold.

The transcription modifier 218 can modify words in the transcription 214 based on the semantic description 216. The transcription modifier 218 can modify the words based on the semantic description increasing the likelihood that the speaker of the audio of speech 202 intended a different word that the word that the language model 210 initially determined to be most likely. In some examples, the transcription modifier 218 can modify words based on a correspondence between a homonym and a semantic description 216 being greater than a correspondence between the word that was transcribed from the audio of speech 202 and the semantic description 216. In some examples, the transcription modifier 218 can maintain, and/or not modify, the words in the transcription 214, based on the semantic description 216 indicating that the word that the language model 210 initially determined to be most likely was the word that the speaker of the audio of speech 202 intended. The transcription modifier 218 can generate and/or output the presented words 220. The electronic device 104 can present and/or display the presented words 220 to the user 102.

Figure 3:
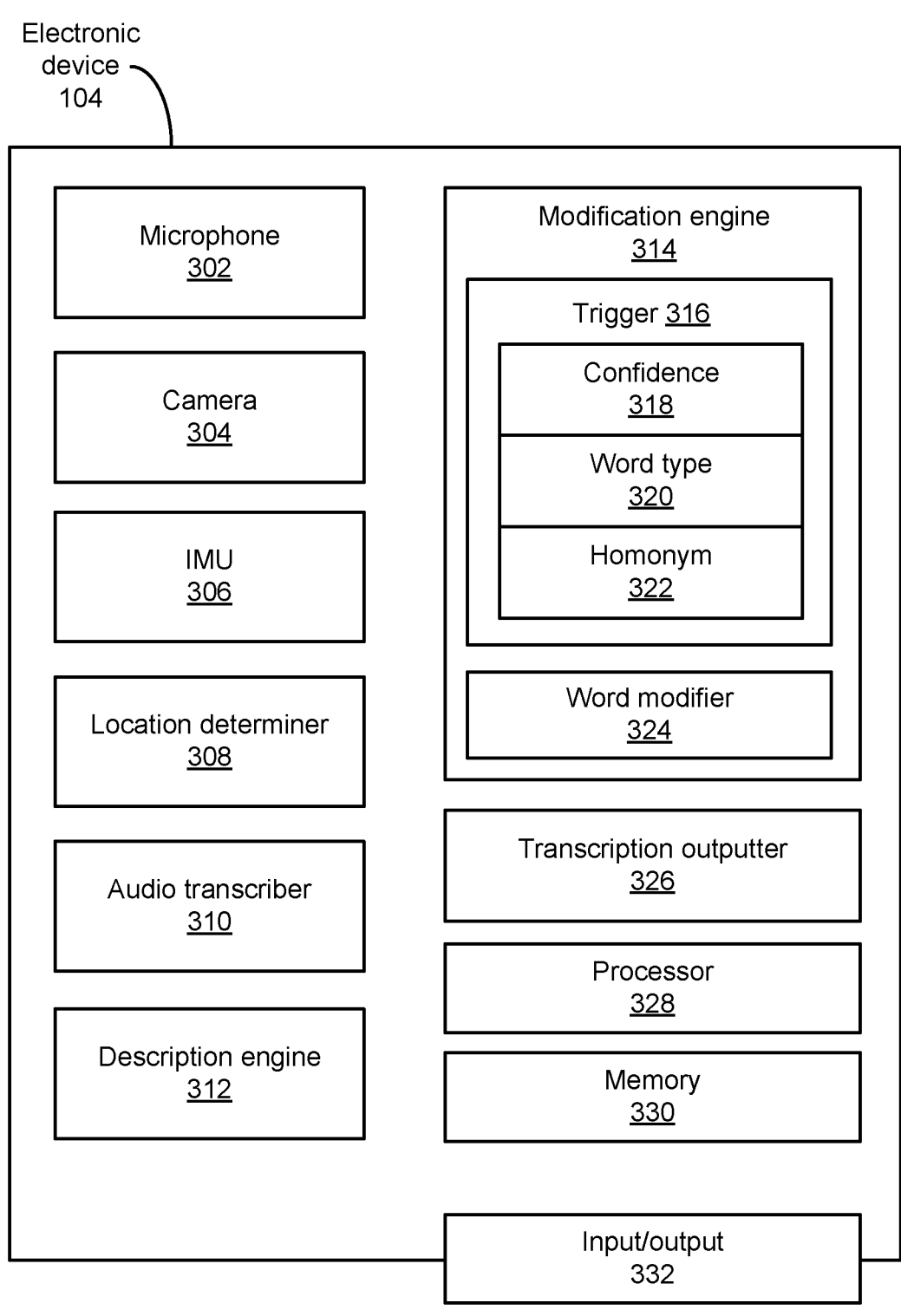
FIG. 3 is a block diagram of the electronic device that transcribes speech.

FIG. 3 is a block diagram of the electronic device 104 that transcribes speech. The electronic device 104 can include a microphone 302. The microphone 302 can receive and/or process audio input, such as the audio of speech 202 and/or the audio 208.

The electronic device 104 can include a camera 304. The camera 304 can capture images and/or photographs. The camera 304 can capture the images and/or photographs as visual input 204.

The electronic device 104 can include an inertial measurement unit (IMU) 306. The IMU 306 can measure and/or process acceleration by the electronic device 104. The electronic device 104 can include a location determiner 308. The location determiner 308 can implement global positioning system (GPS) protocols to determine a location of the electronic device 104. The location input 206 can include measurements and/or determinations performed by the IMU 306 and/or location determiner 308.

The electronic device 104 can include an audio transcriber 310. The audio transcriber 310 can implement methods, functions, and/or techniques described with respect to the language model 210. The audio transcriber 310 can transcribe, and/or transform into text, speech received by the microphone 302. The audio transcriber 310 can also assign confidence levels to words, and/or groups of words within the text transcribed by the audio transcriber 310.

The electronic device 104 can include a description engine 312. The description engine 312 can implement methods, functions, and/or techniques described with respect to the context model 212. The description engine 312 can generate a textual description of the context based on any combination of the visual input 204, location input 206, and/or audio 208. The textual description can include words and/or phrases that describe the scene and/or situation in which the electronic device 104 and/or user 102 is present. In some examples, the description engine 312 can generate a vector of ones and zeroes that represents the context. In some examples, the semantic description is represented by a vector of ones and zeroes.

The electronic device 104 can include a modification engine 314. The modification engine 314 can implement methods, functions, and/or techniques described with respect to the transcription modifier 218. The modification engine 314 can modify the transcription and/or text generated by the audio transcriber 310 based on the textual description and/or context generated by the description engine 312. The modification engine 313 can modify the transcription and/or text generated by the audio transcriber 310 to more closely match the textual description generated by the description engine 312.

The modification engine 314 can include a trigger determiner 316. In some examples, the modification engine 314 can consider modifying words, and/or groups of words, included in the text transcribed by the audio transcriber based on, and/or in response to, the trigger determiner 316 determining that a trigger condition has been satisfied. In some examples, the trigger conditions that the trigger determiner 316 can determine satisfaction of confidence threshold 318, word type 320, and/or homonym 322.

In some example, the trigger determiner 316 can determine whether confidence levels of words satisfy a confidence threshold 318. The confidence levels of words that are determined by the electronic device 104 can indicate a likelihood that the transcribed word is the word that the speaker actually spoke and/or intended to speak. The audio transcriber 310 determined the confidence levels of words. If the trigger determiner 316 determines that the confidence level of a word does not satisfy the confidence threshold 318, such as by being less than the confidence threshold 318, then the modification engine 314 can modify, and/or determine whether to modify, the word based on the semantic description 216 generated by the description engine 312.

In some examples, the trigger determiner 316 can determine whether words are of a word type 320 for which transcription would benefit from the semantic description 216 generated by the description engine 312. The word types 320 could include any combination of nouns, verbs, adjectives, and/or adverbs, as non-limiting examples, and/or exclude certain types of words, such as connectives. The trigger determiner 316 can determine whether a transcribed word is a member of the word type 320 by checking a table, list or other data structure to determine whether the word is a member of the word type 320. If the trigger determiner 316 determines that a given word in the transcription generated by the audio transcriber is of the word type 320, then the modification engine 314 can modify, and/or determine whether to modify, the word based on the semantic description 216 generated by the description engine 312.

In some examples, the trigger determiner 316 can determine whether a transcribed word has a homonym 322. Homonyms of words can include words that have identical pronunciations, and/or have pronunciations that are similar enough to satisfy a similarity threshold. The trigger determiner 316 can determine whether a transcribed word has a homonym by checking a table, list or other data structure to determine whether the word is identified as having homonym. If the trigger determiner 316 determines that the word has a homonym, then the modification engine 314 can modify, and/or determine whether to modify, the word based on the semantic description 216 generated by the description engine 312.

The trigger determiner 316 can also determine that the modification engine 314 should modify, and/or determine whether to modify, a word based on two or more trigger conditions have been met. For example, the trigger determiner 316 could determine that the modification engine 314 should modify, and/or determine whether to modify, a word based on both the confidence level not satisfying the confidence threshold 318 and the word having a homonym 322.

The modification engine 314 can include a word modifier 324. The word modifier 324 can modify words included in the transcription 214 based on the semantic description 216. In some examples, the word modifier 324 can modify words included in the transcription 214 based on the semantic description 216 in response to, and/or based on, the trigger determiner 316 determining that a trigger determination was satisfied. The word modifier 324 can combine the semantic description 216 with the audio of speech 202 and/or transcription and confidence levels of words 214 to generate new confidence levels for words. The word modifier 324 can then select words with the highest confidence levels based on both the semantic description and the audio of speech 202 or the transcription and confidence 214. In some examples, the word modifier 324 will select different words than were originally transcribed by the audio transcriber 310. In some examples, the word modifier 324 will select the same words as were originally transcribed by the audio transcriber 310, and/or will not change the words and/or transcription generated by the audio transcriber 310.

The electronic device 104 can include a transcription outputter 326. The transcription outputter 326 can output the final transcription as modified by, and/or outputted or generated by, the modification engine 314. The transcription outputter 326 can output the transcribed speech by presenting and/or outputting the transcribed text on a display included in the electronic device 104.

The electronic device 104 can include at least one processor 328. The at least one processor 328 can execute instructions, such as instructions stored in at least one memory device 330, to cause the electronic device 104 to perform any combination of methods, functions, and/or techniques described herein.

The electronic device 104 can include at least one memory device 330. The at least one memory device 330 can include a non-transitory computer-readable storage medium. The at least one memory device 330 can store data and instructions thereon that, when executed by at least one processor, such as the processor 328, are configured to cause the electronic device 104 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the electronic device 104 can be configured to perform, alone, or in combination with the electronic device 104, any combination of methods, functions, and/or techniques described herein.

The electronic device 104 may include at least one input/output node 332. The at least one input/output node 332 may receive and/or send data, such as from and/or to, a server, and/or may receive input and provide output from and to a user. The input and output functions may be combined into a single node, or may be divided into separate input and output nodes. The input/output node 332 can include, for example, a microphone, a camera, an IMU, a display such as a touchscreen, a speaker, a microphone, one or more buttons, and/or one or more wired or wireless interfaces for communicating with other computing devices.

Figure 4:
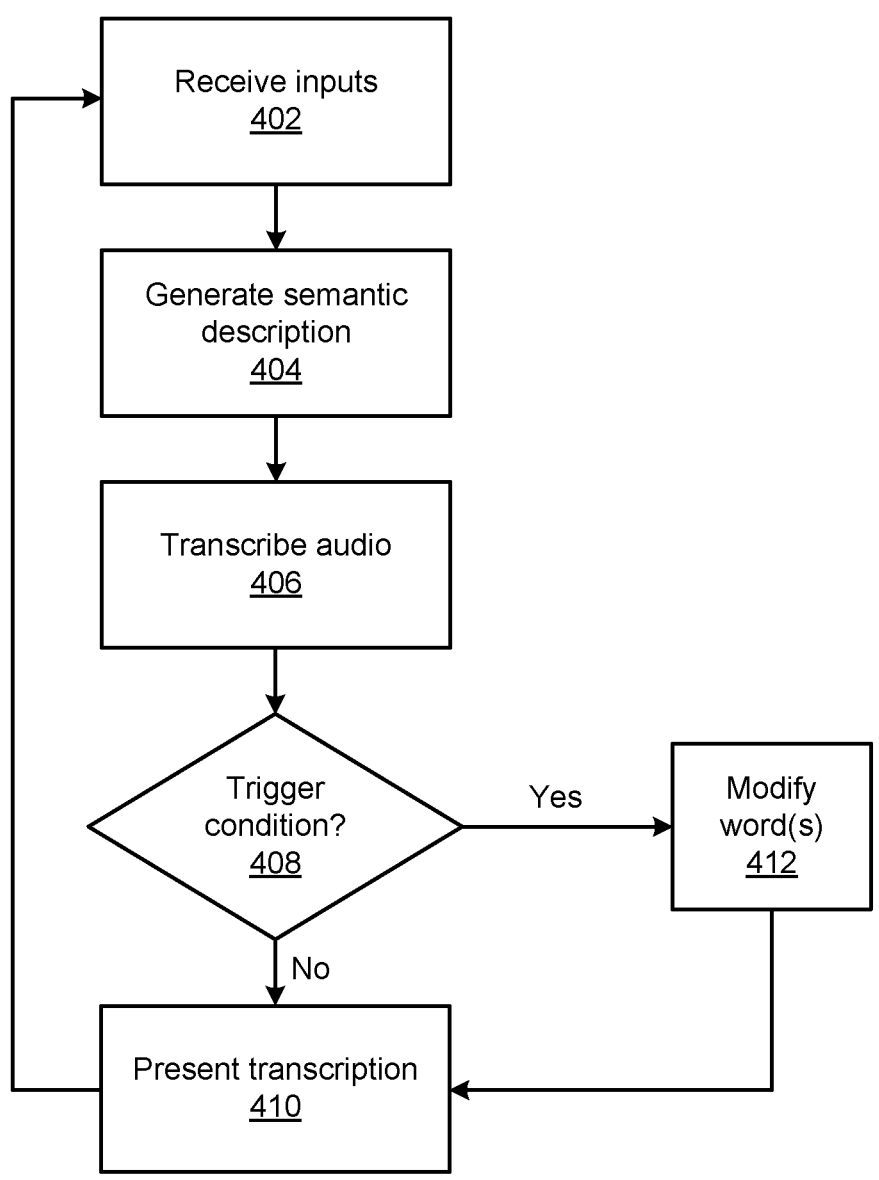
FIG. 4 is a flowchart showing a method of transcribing speech.

FIG. 4 is a flowchart showing a method of transcribing speech. The method can be performed by the electronic device 104.

The electronic device 104 can receive inputs (402). The electronic device 104 can receive any combination of inputs, such as audio of speech 202, visual input 204, location input 206, and/or audio 208 other than the audio of speech 202.

The electronic device 104 can generate a semantic description (404) of the context. The electronic device 104 can generate the semantic description (404) based on inputs such as the visual input 204, location input 206, and/or audio 208. The electronic device can generate the semantic description 216 (404) as discussed above with respect to 212, 216, 312.

The electronic device 104 can transcribe the audio (406) of speech 202. The electronic device 104 can transcribe the audio (406) into a text transcript of the spoken words. The electronic device 104 can transcribe the audio (406) based on any of multiple language models, including Language Models for Dialog Applications (LaMDA).

In some examples, the electronic device 104 can generate a first transcription of the audio (406) based on both the semantic description 216 and the audio input of the speech 202. In some examples, the electronic device 104 can generate the first transcription of the audio (406) based only on the audio input of the speech 202, and make modifications to the first transcription based on the context and/or semantic description.

After transcribing the audio of speech 202 (408), the electronic device 104 can determine whether a trigger condition has been satisfied (408). The trigger condition can be applied to individual words within the transcribed words. The trigger condition(s) can include a confidence threshold not being satisfied, the word being of a certain word type(s), or/or the word having a homonym.

If the trigger condition is satisfied, then the electronic device 104 can modify one or more of the transcribed words (412). The electronic device 104 can modify the word(s) (412) based on the determined context and/or semantic description.

After modifying the word(s) (412) and/or determining that the trigger condition was not met, the electronic device 104 can present the transcription (410) of the speech. The electronic device 104 can present the transcription (410) by presenting the transcribed words on a display included in the electronic device 104. After presenting the transcription (410), the electronic device 104 can continue receiving inputs (402) to transcribe additional words.

Figure 5A:
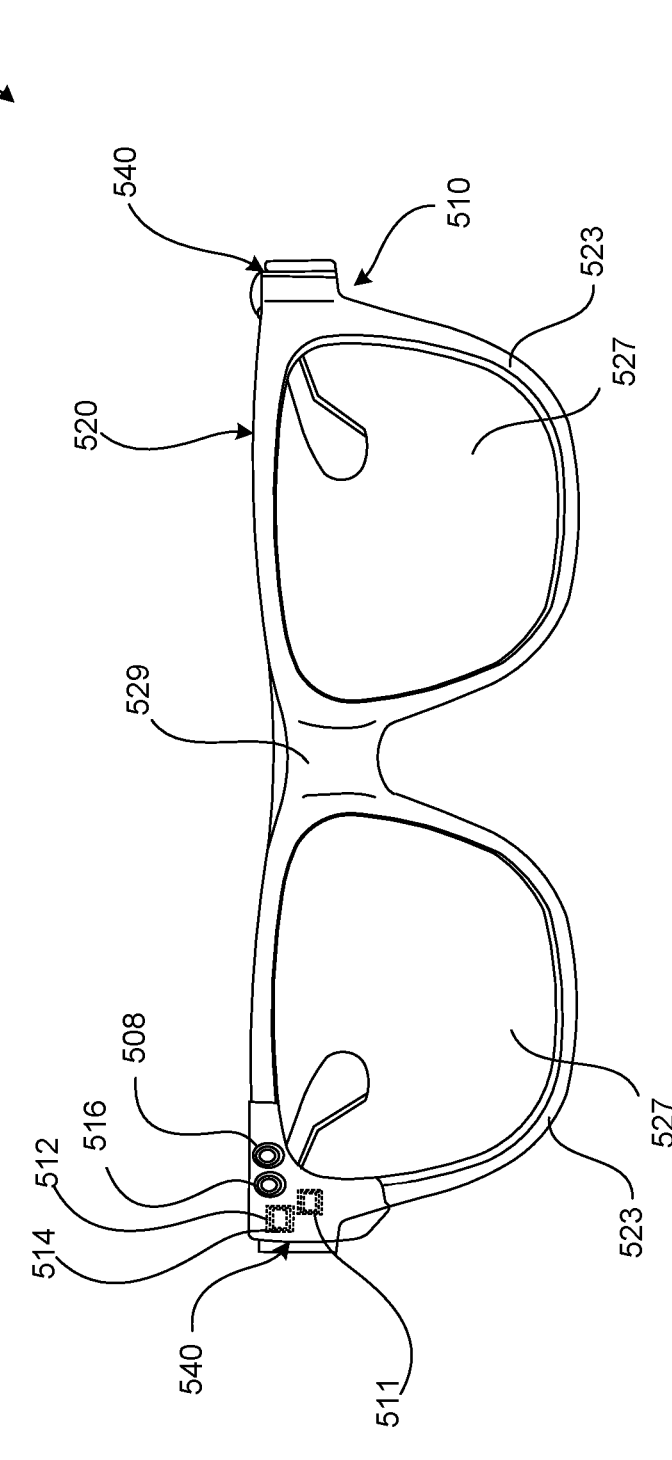
FIG. 5A is a front view.
Figure 5B:
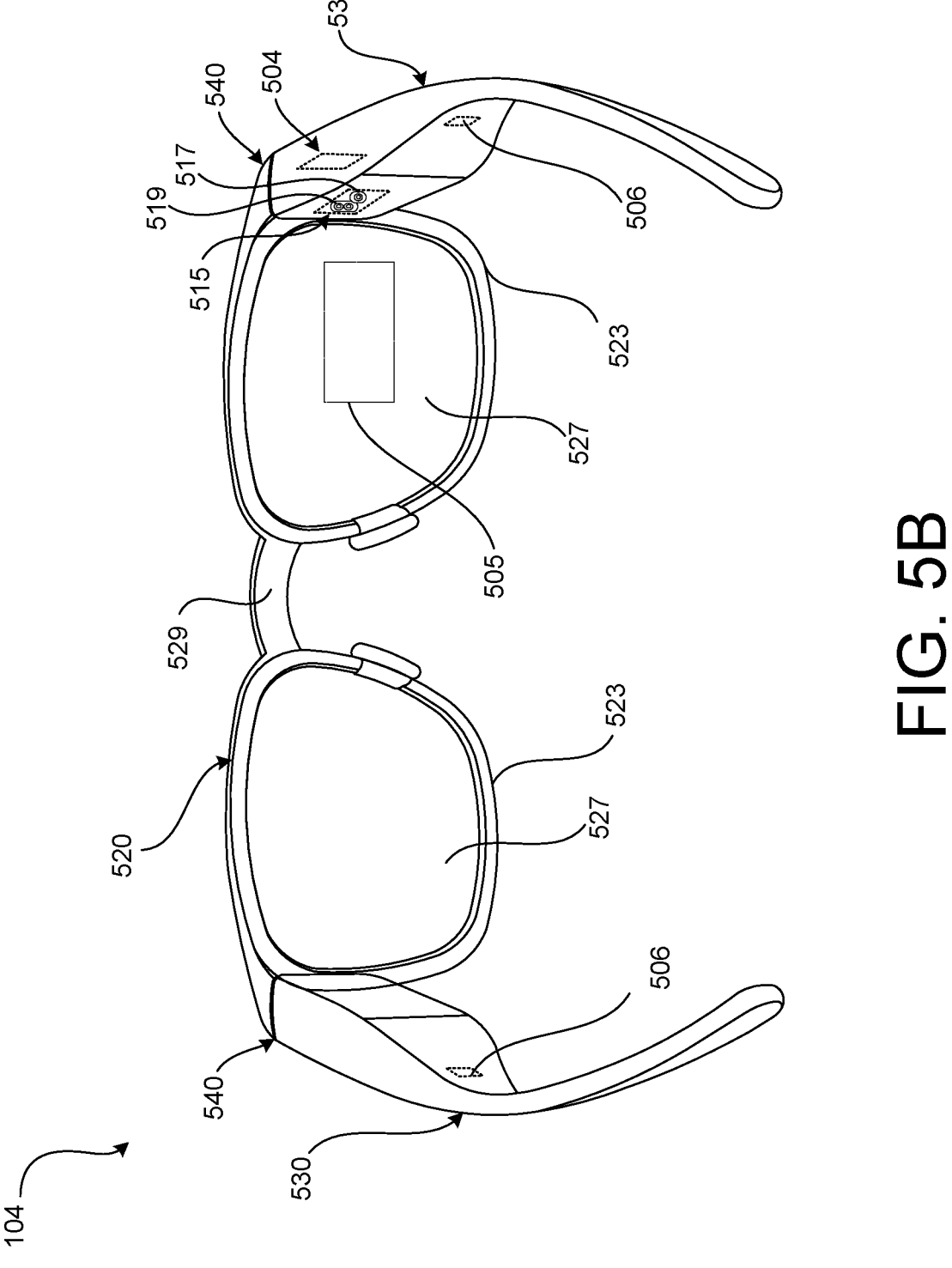
FIG. 5B is a rear view, of the example electronic device shown in FIG. 1.

FIG. 5A is a front view, and FIG. 5B is a rear view, of the example electronic device 104 shown in FIG. 1. The electronic device 104, which can be considered a head-mounted wearable device, includes a frame 510. The frame 510 includes a front frame portion 520, and a pair of temple arm portions 530 rotatably coupled to the front frame portion 520 by respective hinge portions 540. The front frame portion 520 includes rim portions 523 surrounding respective optical portions in the form of lenses 527, with a bridge portion 529 connecting the rim portions 523. The temple arm portions 530 are coupled, for example, pivotably or rotatably coupled, to the front frame portion 520 at peripheral portions of the respective rim portions 523. In some examples, the lenses 527 are corrective/prescription lenses. In some examples, the lenses 527 are an optical material including glass and/or plastic portions that do not necessarily incorporate corrective/prescription parameters.

In some examples, the electronic device 104 includes a display device 504 that can output visual content, for example, at an output coupler 505, so that the visual content is visible to the user. In the example shown in FIGS. 5A and 5B, the display device 504 is provided in one of the two arm portions 530, simply for purposes of discussion and illustration. Display devices 504 may be provided in each of the two arm portions 530 to provide for binocular output of content. In some examples, the display device 504 may be a see-through near-eye display. In some examples, the display device 504 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 527, next to content (for example, digital images, user interface elements, virtual content, and the like) output by the display device 504. In some implementations, waveguide optics may be used to depict content on the display device 504.

In some examples, the electronic device 104 includes one or more of an audio output device 506 (such as, for example, one or more speakers), an illumination device 508, a sensing system 511, a control system 512, at least one processor 514, and an outward facing image sensor 516, or camera 516. In some examples, the sensing system 511 may include various sensing devices and the control system 512 may include various control system devices including, for example, one or more processors 514 operably coupled to the components of the control system 512. In some examples, the control system 512 may include a communication module providing for communication and exchange of information between the electronic device 104 and other external devices. In some examples, the electronic device 104 includes a gaze tracking device 515 to detect and track eye gaze direction and movement. Data captured by the gaze tracking device 515 may be processed to detect and track gaze direction and movement as a user input. In the example shown in FIGS. 5A and 5B, the gaze tracking device 515 is provided in one of the two arm portions 530, simply for purposes of discussion and illustration. In the example arrangement shown in FIGS. 5A and 5B, the gaze tracking device 515 is provided in the same arm portion 530 as the display device 504, so that user eye gaze can be tracked not only with respect to objects in the physical environment, but also with respect to the content output for display by the display device 504. In some examples, gaze tracking devices 515 may be provided in each of the two arm portions 530 to provide for gaze tracking of each of the two eyes of the user. In some examples, display devices 504 may be provided in each of the two arm portions 530 to provide for binocular display of visual content.

Figure 6:
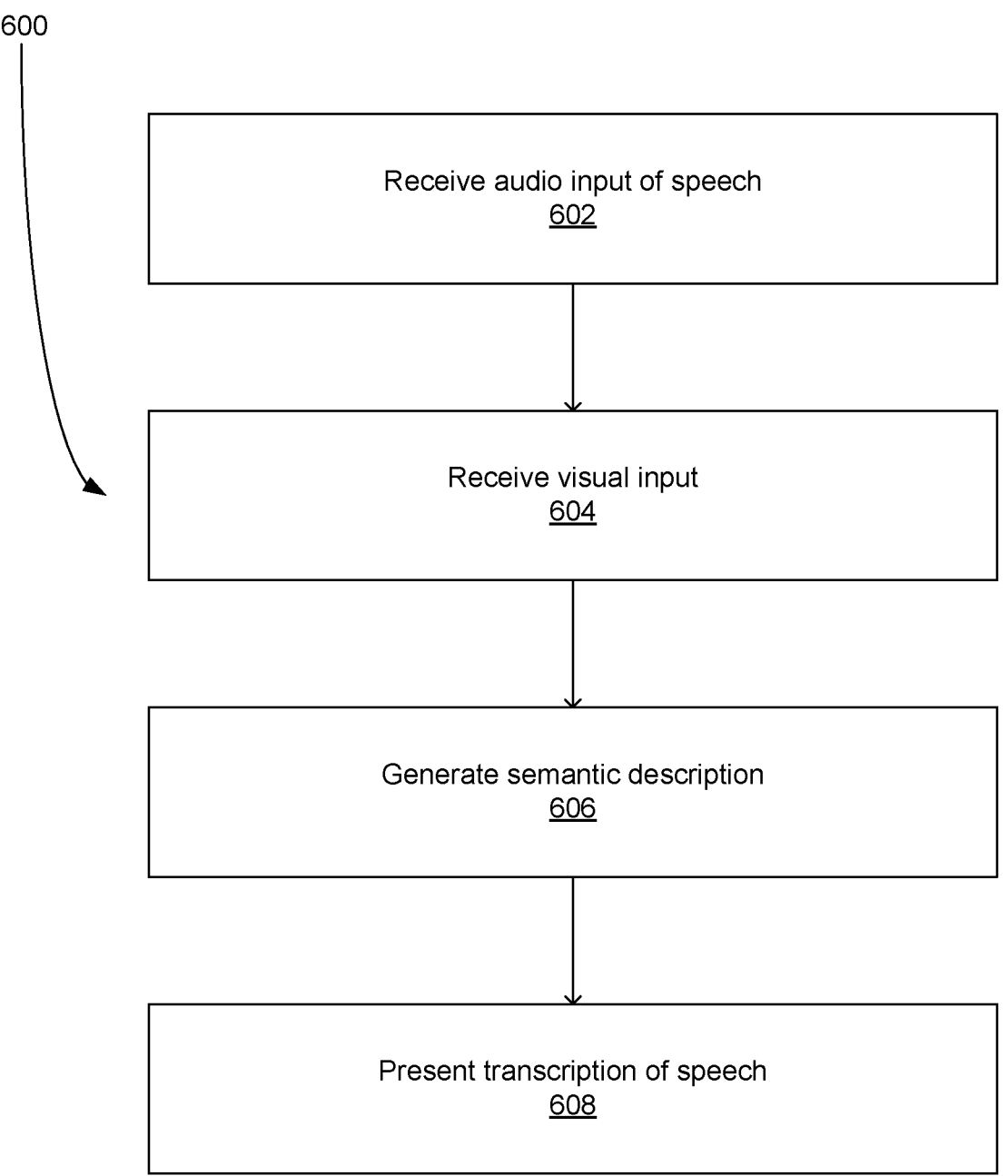
FIG. 6 is a flowchart showing a method performed by the electronic device.

FIG. 6 is a flowchart showing a method 600 performed by the electronic device 104. The method 600 can include the electronic device 104 receiving audio input of speech (602). The method 600 can include the electronic device 104 receiving visual input while receiving the audio input (604). The method 600 can include the electronic device 104 generating a semantic description based on the visual input (606). The method 600 can the electronic device 104 include presenting a transcription of the speech based on the audio input and the semantic description (608).

In some examples, the presenting the transcription of the speech (680) includes transcribing the speech based on the audio input, determining that a confidence level of a word that was transcribed from the speech does not satisfy a confidence threshold, and modifying the word based on the semantic description. The presenting the transcription can include presenting the transcribed speech with the modified word.

In some examples, the presenting the transcription of the speech (608) can include transcribing the speech based on the audio input, and modifying at least one of a noun, verb, adjective, or adverb that was transcribed from the speech. The presenting the transcription can include presenting the transcribed speech with the modified noun, verb, adjective, or adverb.

In some examples, the presenting the transcription of the speech (608) can include transcribing the speech based on the audio input, determining that a confidence level of a word that was transcribed from the speech does not satisfy a confidence threshold, the word including one of a noun, verb, adjective, or adverb, and modifying the word based on the semantic description. The presenting the transcription (608) can include presenting the transcribed speech with the modified word.

In some examples, the presenting the transcription of the speech (608) can include transcribing the speech based on the audio input, determining that a word that was transcribed from the speech has a homonym, and determining that a correspondence between the homonym and the semantic description is greater than a correspondence between the word that was transcribed from the speech and the semantic description. The presenting the transcription (608) can include presenting the transcribed speech with the homonym.

In some examples, the method 600 can be performed by the electronic device 104 worn on a head of a user.

In some examples, the method 600 can further include receiving accelerometer data, and the generating the semantic description (606) can include generating the semantic description based on the visual input and the accelerometer data.

In some examples, the method 600 can further include receiving location data, and the generating the semantic description (606) can include generating the semantic description based on the visual input and the location data.

In some examples, the method 600 can further include receiving input from an audio source other than speech, and the generating the semantic description (606) can include generating the semantic description based on the visual input and the audio source other than speech.

Figure 7:
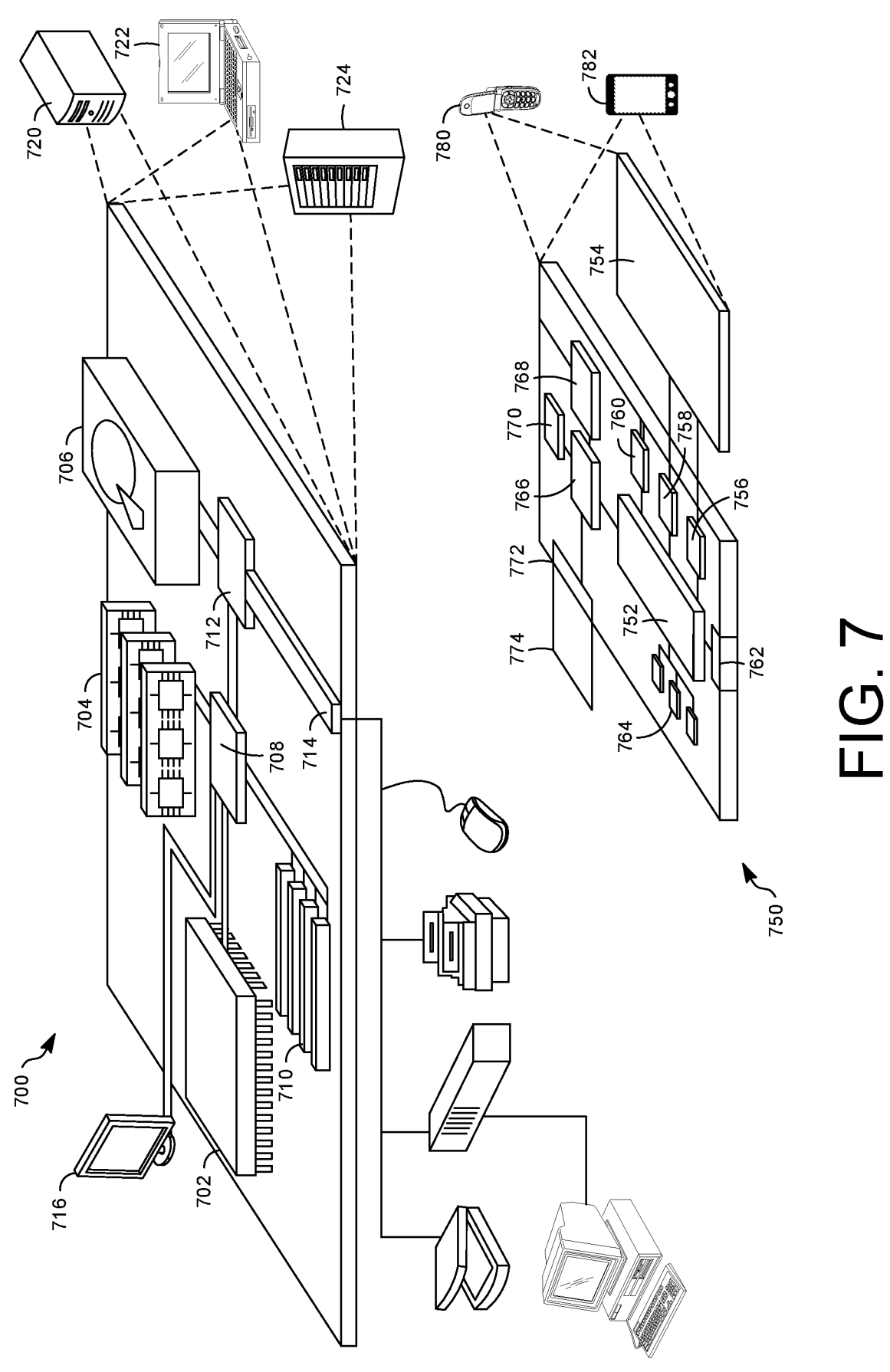
FIG. 7 shows an example of a computer device and a mobile computer device that can be used to implement the techniques described here.

FIG. 7 shows an example of a generic computer device 700 and a generic mobile computer device 750, which may be used with the techniques described here. Either of the computer device 700 or mobile computer device 750 can be an example of, and/or implement methods, functions, and/or techniques described with respect to, the electronic device 104. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750. Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
receiving audio input of speech;
receiving visual input while receiving the audio input;
generating a semantic description of a scene based on the visual input, the semantic description of the scene including a list of objects classified based on the visual input, each object in the list of objects being associated with a confidence level indicating a likelihood that the object corresponds to a category included in the list of objects;

generating a transcription of the speech based on the audio input and the semantic description of the scene; and
presenting the transcription of the speech.

2. The method of claim 1, wherein the generating the transcription of the speech includes:
generating the transcription of the speech based on the audio input;
determining an error in the transcription based on a confidence level of a word that was transcribed from the speech not satisfying a confidence threshold; and
correcting the error in the transcription by modifying the word based on the semantic description of the scene, wherein the presenting the transcription includes presenting the transcription with the modified word.

3. The method of claim 1, wherein the generating the transcription of the speech includes:
transcribing the speech based on the audio input; and
modifying at least one of a noun, verb, adjective, or adverb that was transcribed from the speech, wherein the presenting the transcription includes presenting the transcribed speech with the modified noun, verb, adjective, or adverb.

4. The method of claim 1, wherein the generating the transcription of the speech includes:
transcribing the speech based on the audio input;
determining that a confidence level of a word that was transcribed from the speech does not satisfy a confidence threshold, the word including one of a noun, verb, adjective, or adverb; and
modifying the word based on the semantic description of the scene, wherein the presenting the transcription includes presenting the transcribed speech with the modified word.

5. The method of claim 1, wherein the generating the transcription of the speech includes:
transcribing the speech based on the audio input;
determining that a word that was transcribed from the speech has a homonym; and
determining that a correspondence between the homonym and the semantic description of the scene is greater than a correspondence between the word that was transcribed from the speech and the semantic description of the scene, wherein the presenting the transcription includes presenting the transcribed speech with the homonym.

6. The method of claim 1, wherein the method is performed by an electronic device worn on a head of a user.

7. The method of claim 1, wherein:
the method further comprises receiving accelerometer data; and
the generating the semantic description of the scene includes generating the semantic description of the scene based on the visual input and the accelerometer data.

8. The method of claim 1, wherein:
the method further comprises receiving location data; and
the generating the semantic description of the scene includes generating the semantic description of the scene based on the visual input and the location data.

9. The method of claim 1, wherein:
the method further comprises receiving input from an audio source other than speech; and
the generating the semantic description of the scene includes generating the semantic description based on the visual input and the audio source other than speech.

10. The method of claim 1, wherein the semantic description includes relationships between objects recognized based on the visual input.

11. A head-worn wearable device, comprising:
a microphone;
a camera;
a display;
at least one processor; and
a non-transitory computer-readable storage medium comprising instructions stored thereon that, when executed by the at least one processor, are configured to cause the head-worn wearable device to:
receive audio input of speech via the microphone;
receive visual input while receiving the audio input via the camera;
generate a semantic description of a scene based on the visual input, the semantic description of the scene including a list of objects classified based on the visual input, each object in the list of objects being associated with a confidence level indicating a likelihood that the object corresponds to a category included in the list of objects;
generate a transcription of the speech based on the audio input and the semantic description of the scene; and
present, via the display, the transcription of the speech.

12. The head-worn wearable device of claim 11, wherein the instructions are further configured to cause the head-worn device to modify a word in the transcription of the speech, the modified word including at least one of a noun, a verb, an adjective, or an adverb.

13. The head-worn wearable device of claim 11, wherein:
the instructions are further configured to cause the head-worn device to modify a word in the transcription of the speech;
the modified word has a homonym; and
presenting the transcription of the speech including the modified word includes presenting the transcription of the speech with the homonym as the modified word.

14. A non-transitory computer-readable storage medium comprising instructions stored thereon that, when executed by at least one processor, are configured to cause an electronic device to:
receive audio input of speech;
receive visual input while receiving the audio input;
generate a semantic description of a scene based on the visual input, the semantic description of the scene including a list of objects classified based on the visual input, each object being associated with a confidence level indicating a likelihood that the object corresponds to a certain category included in the list of objects;
generate a transcription of the speech based on the audio input and the semantic description of the scene; and
present the transcription of the speech.

15. The non-transitory computer-readable storage medium of claim 14, wherein the generating the transcription of the speech includes:
generating the transcription of the speech based on the audio input;
determining an error in the transcription based on a confidence level of a word that was transcribed from the speech not satisfying a confidence threshold; and
correcting the error in the transcription by modifying the word based on the semantic description of the scene,
wherein the presenting the transcription includes presenting the transcription with the modified word.

16. The non-transitory computer-readable storage medium of claim 14, wherein the generating the transcription of the speech includes:
transcribing the speech based on the audio input; and
modifying at least one of a noun, verb, adjective, or adverb that was transcribed from the speech,
wherein the presenting the transcription includes presenting the transcribed speech with the modified noun, verb, adjective, or adverb.

17. The non-transitory computer-readable storage medium of claim 14, wherein the generating the transcription of the speech includes:
transcribing the speech based on the audio input;
determining that a word that was transcribed from the speech has a homonym; and
determining that a correspondence between the homonym and the semantic description of the scene is greater than a correspondence between the word that was transcribed from the speech and the semantic description of the scene,
wherein the presenting the transcription includes presenting the transcribed speech with the homonym.

18. The non-transitory computer-readable storage medium of claim 14, wherein:
the instructions are further configured to cause the electronic device to receive input from an audio source other than speech; and
the generating the semantic description of the scene includes generating the semantic description of the scene based on the visual input and the audio source other than speech.

* * * * *